3,527,863
TISSUE INFILTRANT
Theodore E. Weichselbaum, St. Louis, Mo., assignor, by mesne assignments, to Brunswick Corporation, Chicago, Ill., a corporation of Delaware
No Drawing. Filed Nov. 25, 1964, Ser. No. 413,993
Int. Cl. A01n 1/30; G01n 1/30
U.S. Cl. 424—3                                    7 Claims

ABSTRACT OF THE DISCLOSURE

A composition for impregnating tissues with wax for sectioning on a microtome, which contains a normally solid wax plus 0.2% to 1% dimethyl sulfoxide. The composition is applied to the tissue as a melt and the dimethyl sulfoxide is sufficient to improve penetration of the tissue by the wax to provide a tissue specimen suitable for sectioning.

---

This invention relates to compositions for infiltrating or penetrating animal tissues for preparing the tissues for sectioning on a microtome. More particularly, the invention relates to a new and useful infiltrating composition having improved tissue penetration properties imparted thereto by the inclusion of a penetration enhancing agent.

In zoological studies it is often necessary to prepare tissue for sectioning on a microtome or the like. Usually, the tissue, which may be fresh or formaldehyde-fixed mammalian or non-mammalian tissue, is penetrated with paraffin or mixtures of paraffin and organic polymers prior to sectioning. The infiltration is usually performed at an elevated temperature and/or under vacuum conditions so that the paraffin or other wax composition infiltrates the tissue. However, it is difficult to provide uniform distribution of the wax within the tissue for producing uniform and thin tissue sections from the microtome. Additionally, the rate of penetration by the infiltrant is often very low, requiring relatively long periods of time for the infiltration process.

It is an object of this invention to provide a new and improved composition for infiltrating tissue.

It is a more particular object of this invention to provide such an infiltrant composition which includes a penetration improving agent.

Still another object of this invention is to increase the rate of penetration of a paraffin or other wax composition used in the infiltration of tissue and to provide more uniform distribution of the composition in the tissue.

Other objects will be apparent from the following description.

While this invention is susceptible of embodiment in many different forms, there will herein be described in detail embodiments of the invention with the understanding that the present disclosure is to be considered as an exemplification of the principles of the invention and is not intended to limit the invention to the embodiments described.

According to the present invention, a small amount of dimethyl sulfoxide, sufficient to improve the penetration properties of an infiltrant composition, is added to the infiltrant composition. The infiltrant composition may be any of the usual wax compositions used for infiltrating animal tissues. Such wax compositions are commercially available. Usually the composition is a normally solid long-chain paraffin wax or a mixture of such paraffin wax and a small amount, e.g. 0.2 to 2% by weight, of a normally solid elastomeric synthetic polymer which is compatible with the paraffin wax, such as polyvinyl acetate, polybutene, etc. The polymers in such infiltrant compositions are merely flexibilizers and are non-reactive with respect to the sulfoxide portion of the dimethyl sulfoxide molecule. For sake of convenience, the paraffin and paraffin-polymer mix will be referred to herein merely as paraffin wax, since the presence or absence of polymer in the paraffin wax is unimportant to the present invention. Any such wax is suitable for use in accordance herewith, since the dimethyl sulfoxide is compatible with all such waxes.

In the preferred form of the present invention, the amount of dimethyl sulfoxide is 0.2 to 1.0 volume percent based on the volume of wax. Lesser amounts of dimethyl sulfoxide may be used since even very small amounts will give some improvement in penetration. Larger amounts, which are insufficient to render the wax liquid, can also be used. Generally, the compositions may be prepared by melting the wax, adding the dimethyl sulfoxide to the melt and mixing, or by adding the dimethyl sulfoxide to the wax before melting the wax to provide a melt mixture of both ingredients. The composition may be used directly or may be solidified and stored. To use the solidified stored composition, the composition can be remelted and applied to the tissue by normal tissue infiltrant techniques.

The composition of the present invention can be used for infiltrating any animal tissue, whether fresh or fixed with formaldehyde or other fixing agent, in accordance with the usual infiltrating techniques, e.g. employing heat and/or vaccum.

The following examples are offered by way of illustration of this invention and are not intended to be limiting on the invention.

EXAMPLE I

A mass of paraffin wax (M.P. about 56–58° C.) was melted, and .2% by volume dimethyl sulfoxide was added to the wax. The melt was mixed and then permitted to solidify.

EXAMPLE II

A mass of paraffin was (M.P. about 56–58° C.) was melted, and 0.75% by volume dimethyl sulfoxide was added to the wax. The melt was mixed and then permitted to solidify.

EXAMPLE III

A mass of paraffin wax (M.P. about 56–58° C.) was melted and 1.0% by volume dimethyl sulfoxide was added to the wax. The melt was mixed and then permitted to solidify.

The infiltration or penetration of the tissue can be carried out using the wax and dimethyl sulfoxide mixture in a molten state. The wax is normally solid, i.e. at room temperature (about 25 to 30° C.), but has a melting point below the boiling point of the dimethyl sulfoxide, i.e. about 100° C. under atmospheric conditions, so that the melt mixture can be prepared without driving off the dimethyl sulfoxide. In an especially preferred procedure, the infiltration is carried out in a vacuum or at a pressure substantially below atmospheric to lessen the possibility of air being trapped within the tissue. After infiltration, the tissue can be clarified with xylol, toluene, or the like, and then encased in an additional amount of the wax composition by placing the clarified infiltrated tissue in a mold, adding molten wax composition and permitting the wax to solidify in accordance with normal tissue preparation procedures.

The use of infiltrant compositions of the present invention is illustrated by the following examples, which are exemplary in nature and not intended to be limiting on the invention.

EXAMPLE IV

A piece of fresh tissue was placed in a container equipped for evacuation. An aliquot of the composition of Example I was melted and poured over the tissue to cover the tissue, and the container was closed. The container was evacuated to an interior pressure of 20 mm./Hg while maintaining the infiltrant composition liquid by applied heat. The container was then permitted to repressurize to atmospheric pressure and was opened and the infiltrated product was removed. The infiltrated tissue was clarified in xylol and then encased in the additional wax composition of Example I.

EXAMPLE V

The procedure of Example IV was repeated using the composition prepared in Example II in lieu of the composition of Example I.

EXAMPLE VI

The procedure of Example IV was repeated using the composition prepared in Example III in lieu of the composition of Example I.

EXAMPLE VII

The procedure of Example V was repeated using a piece of formaldehyde-fixed tissue in lieu of the fresh tissue.

PREPARATION I

The procedure of Example V was repeated except that the dimethyl sulfoxide was omitted from the wax composition.

Each of the tissues prepared in Examples V and VI and Preparation I was sectioned on a microtome to a 4 micron thickness and the sections were examined under a microscope. It was found that the wax composition was more uniformly distributed in the sections from the tissues of Examples IV, V, VI and VII while, in the sections from the tissue of Preparation I, definite voids existed.

Various tissue samples were prepared in accordance with the procedure outlined in Examples IV, V, VI and VII using infiltrant compositions prepared in accordance with this invention in some of the runs and similar infiltrant compositions omitting the dimethyl sulfoxide in other runs. Based on these runs, it was found that the compositions of the present invention gave good penetration in less time than the compositions prepared without dimethyl sulfoxide.

All percentages given herein are percentages given by volume unless otherwise indicated.

I claim:
1. A solid wax composition for infiltrating tissue prepared by mixing a normally solid paraffin wax as a melt with a small amount, insufficient to render liquid the solid wax composition, of dimethyl sulfoxide and permitting the composition to solidify.

2. The composition of claim 1 wherein said small amount is in the range of 0.2 to about 1.0% by volume.

3. The wax composition of claim 1 wherein said paraffin wax has a melting point in the range of about 56° to 58° C.

4. A method of preparing a tissue for sectioning on a microtome, which comprises infiltrating the tissue with a melt of the composition of claim 1 at a temperature above the melting point of the paraffin wax and below the boiling point of the dimethyl sulfoxide, and resolidifying the wax as an infiltrant in the tissue.

5. The wax composition of claim 1 additionally containing from 0.2% to 2% by weight of a normally solid elastomeric synthetic polymer which is compatible with the paraffin wax.

6. The wax composition of claim 5 wherein said polymer is polyvinyl acetate.

7. The wax composition of claim 5 wherein said polymer is polybutene.

References Cited

UNITED STATES PATENTS 3,009,893 11/1961 Barnes.
3,234,158 2/1966 Pfluger.

FOREIGN PATENTS 644,613 3/1964 Belgium.

OTHER REFERENCES

Pottz, Tech. Bull. Reg. of Med. Tech., vol. 34, No. 10, 1964, pp. 552–4.

Lillie, Histopathologic Technic, Blakiston Co., Phila., Pa., 1948, pp. 42–49.

Jacob (2), Current Therapeutic Res., vol. 6, No. 3, March 1964, reprint, pp. 193–198.

Product Information Bulletin, Crown Zellerbach, Camas, Washington, No. 326–4, August 1961, pp. 1, 5–8.

Uramura, translation from Journal: Igaku Kenkyu, vol. 30, 1961 (pp. 2235–61), pages cited from translation, pp. 4, 5.

ALBERT T. MEYERS, Primary Examiner

A. P. FAGELSON, Assistant Examiner

U.S. Cl. X.R.

424—75, 337